May 21, 1968 J. MYLEWSKI 3,384,417
STONE CUTTING CHAIN WITH MEANS FOR PREVENTING
ACCUMULATION OF COMMINUTED MATERIAL
Filed Jan. 7, 1966 2 Sheets-Sheet 2

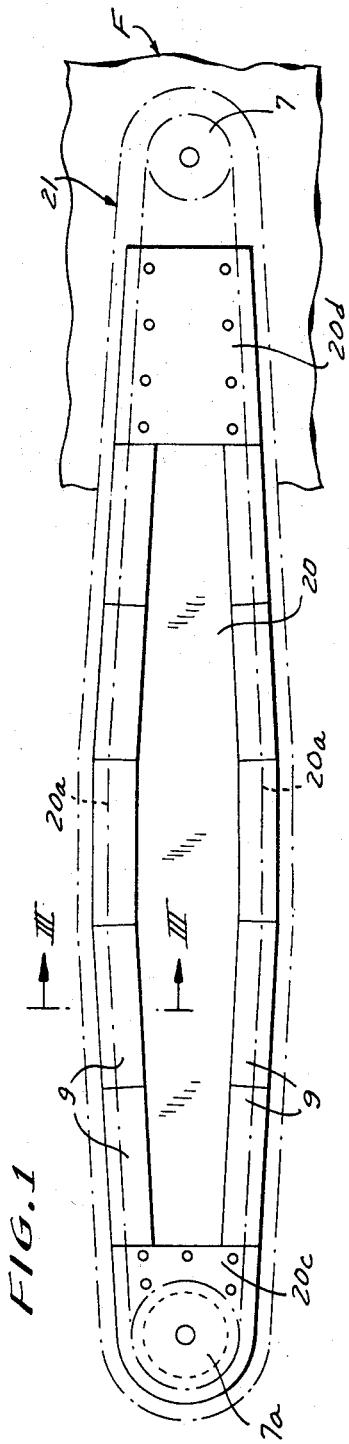
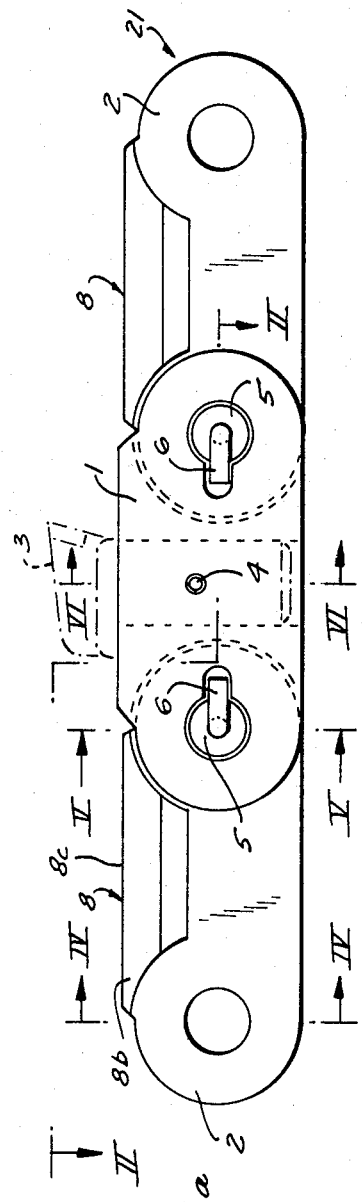
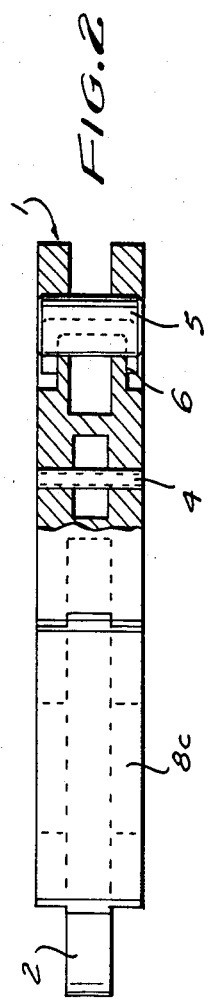

INVENTOR.
BY

United States Patent Office 3,384,417
Patented May 21, 1968

3,384,417
STONE CUTTING CHAIN WITH MEANS FOR PREVENTING ACCUMULATION OF COMMINUTED MATERIAL
Johann Mylewski, Wattenscheid, Germany, assignor to Maschinenfabrik Korfmann G.m.b.H., Witten (Ruhr), Germany
Filed Jan. 7, 1966, Ser. No. 519,356
Claims priority, application Germany, Jan. 9, 1965, M 63,732
10 Claims. (Cl. 299—82)

ABSTRACT OF THE DISCLOSURE

A device for cutting stone or the like comprises an elongated supporting arm. A guide channel is provided on the supporting arm outwardly facing. A sprocket wheel is provided in the region of one end of the supporting arm. An endless chain is trained about a portion of the sprocket wheel and has stringers which extend into the channel. The chain consists of alternating articulately connected links and cutters and each of the links is provided with a closure portion which restricts the entry of comminuted material into the corresponding part of the channel and from which comminuted material which may have accumulated thereon is expelled by the teeth of the sprocket wheel.

The present invention relates to a device for cutting stone or similar hard materials. More particularly, the invention relates to improvements in a chain which may be utilized in such cutting devices.

In cutting of stone, the chain of the cutting device must be constructed and mounted in such a way that little or no comminuted material can penetrate between the chain links and the guide means in which the stringers of the chain travel between two sprocket wheels. If permitted to penetrate between the chain links and the guide means, such comminuted material forms a paste which impedes proper guidance of the chain and offers considerable resistance to movement of the chain links so that the chain drive consumes too much energy. Furthermore, comminuted particles of stone which are allowed to penetrate between the chain links and the guide means will cause excessive wear on such parts so that the guide means and/or the chain must be replaced at frequent intervals. Still further, a stone cutting device must be constructed and assembled with a view to prevent accumulation of comminuted material in or on the links of the chain because such material might interfere with proper training of the chain around its sprockets. It happens again and again that the comminuted material forms a crust on the sprocket wheels and/or on the chain links whereby the crust not only prevents proper guidance of the chain during travel around the sprocket wheels but actually lifts the chain off the sprocket teeth to thus prevent proper advance of the chain while the sprocket wheels rotate.

Accordingly, it is an important object of the present invention to provide a device for cutting stone or the like wherein the chain is constructed and assembled in such a way that its links are automatically cleaned when the cutting device is in actual use.

Another object of the invention is to provide a cutting device wherein the chain prevents penetration of comminuted material into the guide means.

A further object of the invention is to provide a cutting device wherein the links are cleaned in response to travel around one or more sprocket wheels.

An additional object of the invention is to provide a cutting device wherein the links as well as the cutters of the chain cooperate with each other to prevent penetration of comminuted stone into the channel or channels defined therefor by the guide means.

A concomitant object of the invention is to provide improved sprocket wheels which may be utilized in a cutting device of the above outlined characteristics.

Still another object of the invention is to provide a novel supporting structure for the chain of my improved cutting device.

An ancillary object of the invention is to provide a novel coupling between the links and cutters of the improved chain.

A further object of the invention is to provide a stone cutting device whose useful life exceeds considerably the useful life of all such stone cutting devices which are known to me at this time.

An additional object of the instant invention is to provide a cutting device which, in addition to being capable of forming kerfs in stone, is equally useful in cutting of coal, concrete and similar relatively hard materials.

Briefly stated, one feature of my present invention resides in the provision of a device for cutting stone or the like which comprises an elongated supporting arm having two end portions and carrying guide means defining elongated outwardly extending channel means, a sprocket wheel at one end portion of the supporting arm, and an endless chain trained around a portion of the sprocket wheel and having stringers extending into the channel means. The chain comprises alternating cutters and links which are articulately coupled to each other, and each link comprises a closure portion which closes the corresponding part of the channel means against entry of comminuted material when the cutters penetrate into stone or the like to form a kerf.

Each closure portion may resemble a body of T-shaped cross-sectional outline whereby the stem of the T-shaped body extends into the inner portion of the channel means and the head enters the outermost portion of the channel means to prevent penetration of comminuted material toward the stem. The sprocket wheel preferably comprises two annuli of aligned teeth which define between themselves an annular groove for the stems of consecutive closure portions. In other words, during travel around the sprocket wheel, each stem is straddled by two teeth of the sprocket wheel and such teeth expel or separate any such comminuted material which happens to adhere to the stem. The width of the cutters preferably equals the maximum width of closure portions and each cutter carries at least one outwardly extending material-removing tooth whose width exceeds only slightly the width of the guide means.

The novel features which are considered as characteristic of the invention are set forth in particular in the appended claims. The improved chain itself, however, both as to its construction and the mode of assembling and utilizing the same, together with additional features and advantages thereof, will be best understood upon perusal of the following detailed description of a specific embodiment with reference to the accompanying drawings, in which:

FIG. 1 is a diagrammatic side elevational view of a cutting device which embodies my invention;

FIG. 1a is an enlarged side elevational view of a portion of the chain;

FIG. 2 is a partially end elevational and partly sectional view, substantially as seen in the direction of arrows from the line II—II of FIG. 1a;

FIG. 4 is a transverse vertical section through a link of the chain, substantially as seen in the direction of arrows from the line IV—IV of FIG. 1a;

FIG. 5 is a transverse vertical section through an articulate connection between a link and a cutter substantially as seen in the direction of arrows from the line V—V of FIG. 1a;

FIG. 6 is a fragmentary transverse vertical section through a cutter substantially as seen in the direction of arrows from the line VI—VI of FIG. 1a;

Figure 3:
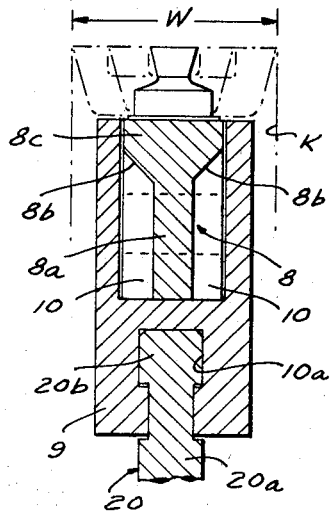
FIG. 3 is an enlarged fragmentary transverse vertical section, substantially as seen in the direction of arrows from the line III—III of FIG. 1 and illustrates the manner in which a closure portion can prevent entry of comminuted material into the channel means defined by the guide means.
Figure 4:
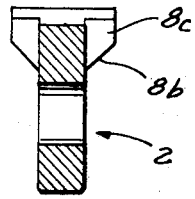

Referring to the drawings in detail, and first to FIGS. 1 and 3, there is shown a device for cutting stone or the like which comprises an elongated flat supporting arm or boom 20 having two mirror symmetrical edges 20a provided with beads 20b extending into inner channels 10a provided in guide means composed of two rows of H-shaped guide members 9. The left-hand end portion 20c of the arm 20 is reinforced and carries an idler sprocket wheel 7a. A driver sprocket wheel 7 is adjacent to but outwardly spaced from the reinforced right-hand end portion 20d of the arm 20, this end portion 20d being bolted or otherwise rigidly affixed to a movable frame member F forming part of a stone cutting machine of the type disclosed in my copending application Ser. No. 519,369, entitled "Machine for Cutting Stone or the Like." The exact construction and mounting of guide members 9 is disclosed in my copending application Ser. No. 517,272, entitled "Device for Cutting Stone or the Like."

An endless chain 21 is trained around the sprocket wheels 7, 7a and its stringers extend into outwardly extending channels 10 defined by the guide members 9. The sprocket 7 is driven by a suitable motor, not shown, and the arm 20 is rockable about the axis of the sprocket wheel 7 so that the one or the other stringer of the chain 21 may cut a kerf into a horizontal, vertical or otherwise inclined surface. Also, the arm 20 is preferably rockable about a vertical axis and the frame F is preferably mounted on a travelling carriage so that the cutting device may be moved to any desired position with reference to rock, ore or stone in an underground excavation or above the ground. Such universal adjustability and mobility of the cutting device is fully disclosed in my aforementioned copending application which deals with the entire machine.

One feature of my present invention resides in special configuration of alternating cutters 1 and links 2 which constitute the chain 21. Each cutter 1 comprises an outwardly extending material-removing tooth 3 which comes into actual contact with the material to be cut and which forms a kerf K (see FIG. 3) whose width W exceeds the width of the guide member 9 only to the extent necessary to prevent jamming of the chain 21. Each tooth 3 is removably mounted in the body of the respective cutter 1 and is secured therein by a transversely extending pin 4, see FIGS. 1a, 2 and 6. The pins 4 may be screwed press-fitted or otherwise secured to the teeth 3 or cutters 1. Pivot pins 5 connect the ends of cutters 1 and links 2 to each other in a manner best shown in FIGS. 1a, 2 and 5. Each such pin 5 is held against axial movement by a U-shaped retaining element 6 whose prongs are received in lateral recesses machined into the side faces of the cutters 1.

Each link 2 comprises a centrally located elongated closure portion 8 of T-shaped cross-sectional outline, see FIGS. 1a, 2, 3 and 4.

Figure 5:
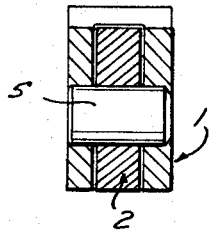
Figure 6:
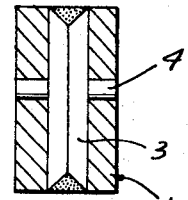

The stems 8a of the sealing portions are provided with inclined side faces 8b which diverge toward the heads 8c, and the width of the heads 8c is such that they close the outermost zones of the outer channels 10 to thereby prevent penetration of comminuted material toward the stems 8a, i.e., into the channels 10. The cutters 1 also fill the corresponding portions of the channels 10 so that these channels are kept clean and the wear upon the guide members 9 and parts 1, 2 of the chain 21 is held to a minimum. In other words, the wear on such parts is due mainly to friction which develops when the teeth 3 are caused to penetrate into stone, coal or the like. FIG. 6 shows that the cross-sectional outline of the cutter 1 resembles a rectangle which fills the corresponding portion of the outer channel 10. FIG. 5 illustrates the same feature. Thus, the composite channels defined by the outer channels 10 of the two rows of guide member 9 are closed against entry of comminuted material to insure that the members 9 can guide the stringers of the chain 21 with requisite precision and with a minimum of wear. While travelling between the ends of the supporting arm 20, the links 2 may be fully concealed in the channels 10.

Figure 7:
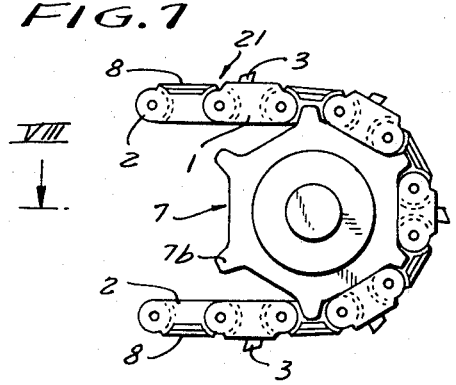
FIG. 7 is an enlarged side elevational view of the right-hand portion of the cutting device shown in FIG. 1 and illustrates the driver sprocket wheel.
Figure 8:
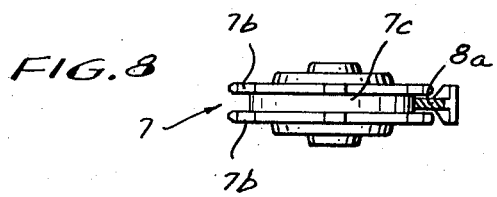
FIG. 8 is a section substantially as seen in the direction of arrows from the line VIII—VIII of FIG. 7.

The driver sprocket wheel 7 comprises two annuli of sprocket teeth 7b which define between themselves an annular groove 7c, see FIGS. 7 and 8. When the wheel 7 rotates, the stems 8a of closure portions 8 on consecutive links 2 travel in the groove 7c whereby the teeth 7b remove any such comminuted material which happens to adhere to the innermost portions of the stems 8a. Such material is expelled along the outwardly diverging side faces 8b. The cutters 1 travel in the spaces between consecutive pairs of transversely aligned teeth 7b.

FIG. 1 shows that the right-hand end portion 20d of the arm 20 is spaced from the driver sprocket wheel 7. This enables the teeth 7b to properly engage the links 2 without any interference on the part of the end portion 20d. The sprocket wheel 7a is of similar construction. FIG. 3 shows that the thickness of the arm 20 is less than the width of a guide member 9; this insures that the width W of the kerf K need not exceed substantially the width of the guide means. Otherwise, the drive for the sprocket wheel 7 would consume too much energy, or the formation of a kerf would be too slow.

In cutting of stone, concrete or the like, the comminuted material which is removed by the teeth 3 of the cutters 1 is wet and forms a paste. Wetting is necessary to prevent overheating of the chain. A very important advantage of the chain 21 is that its links 2 are not box-shaped so that they do not tend to accumulate comminuted material which could not be expelled by the teeth 7b of the sprocket wheel 7. Thus, and were the wheel 7 provided with a single row of teeth 7b, and were the links 2 provided with "blind" pockets for entry of such teeth 7b, the teeth could not expel comminuted material from the pockets even though the links would be capable of preventing entry of comminuted material into the channels 10 of the guide members 9. In other words, by the simple expedient of providing the sprocket wheels 7, 7a with two annuli of teeth 7b, and by forming the links 2 with T-shaped sealing portions 8, I avoid the formation of blind pockets because the transversely aligned teeth 7b straddle, rather than enter into, the links 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a device for cutting stone or the like, an elongated supporting arm having two end portions; guide means provided on said supporting arm and defining outwardly extending channel means intermediate said end portions; a sprocket wheel at one end portion of said supporting arm; and an endless chain trained around a portion of said sprocket wheel and having stringers extending into said channel means, said chain comprising alternating articulately connected links and cutters and each of said links having a closure portion which restricts entry of comminuted material into the corresponding part of said channel means, said closure portions being constructed and arranged so as to cooperate with teeth on said sprocket wheel whereby the teeth expel such comminuted material as may accumulate on said closure portions.

2. A structure as set forth in claim 1, wherein each of said closure portions is of T-shaped cross-sectional outline and includes a head which closes the outermost zone of said channel means between the adjoining cutters when the corresponding link travels in said guide means.

3. A structure as set forth in claim 1, wherein the width of said cutters equals the width of said channel means and wherein each cutter comprises a material-removing tooth extending outwardly and beyond said channel means, the width of said material-removing teeth exceeding only slightly the width of said guide means.

4. A structure as set forth in claim 1, further comprising an idler sprocket wheel journalled in the other end portion of said supporting arm, said chain being trained around both said sprocket wheels.

5. A structure as set forth in claim 4, wherein said supporting arm comprises two elongated edges and said guide means comprises two rows of guide members extending along and secured to the respective edges, the thickness of said supporting arm being less than the width of said guide members.

6. A structure as set forth in claim 5, wherein said cutters comprise portions which completely fill the corresponding zones of said channel means while such cutter portions travel in said guide members.

7. A structure as set forth in claim 1, wherein each of said cutters comprises a detachable material-removing tooth and wherein the width of said cutters approximates the maximum width of said sealing portions.

8. A structure as set forth in claim 7 wherein, while travelling in said channel means, said links are fully received in said guide means.

9. In a device for cutting stone or the like, an elongated supporting arm having two end portions; guide means provided on said supporting arm and defining outwardly extending channel means intermediate said end portions; a sprocket wheel adjacent but spaced from one end portion of said supporting arm and comprising two annuli of aligned sprocket teeth defining between themselves an annular groove; and an endless chain trained around a portion of said sprocket wheel and having stringers extending into said channel means, said chain comprising alternating articulately connected links and cutters and each of said links having a closure portion arranged to travel in said groove so that said teeth expel such comminuted material as may accumulate on the closure portions.

10. A structure as set forth in claim 9, wherein each of said closure portions comprises a head and a stem which travels in the groove of said sprocket wheel, said stems being provided with inclined faces diverging toward the respective heads so that said teeth can expel comminuted material along said faces when the corresponding stems travel in said groove.

References Cited
UNITED STATES PATENTS

| | | | |
|---|---|---|---|
| 1,782,408 | 11/1930 | Cartlidge | 299—84 |
| 2,664,120 | 12/1953 | Hinkley | 299—82 X |
| 2,766,979 | 10/1956 | Calder | 299—82 |
| 2,810,568 | 10/1957 | Fritzsche | 299—82 |

FOREIGN PATENTS

| | | |
|---|---|---|
| 868,605 | 5/1961 | Great Britain. |

ERNEST R. PURSER, *Primary Examiner.*